J. W. FOSTER.
PAD FOR HORSE COLLARS.
APPLICATION FILED OCT. 16, 1908.
927,721.
Patented July 13, 1909.
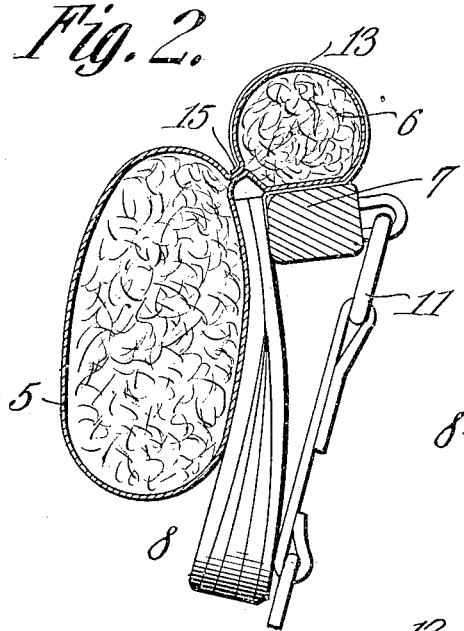
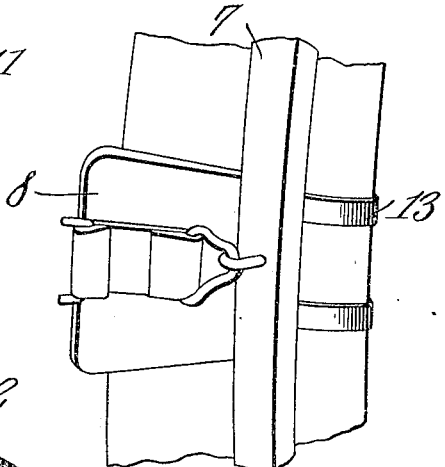
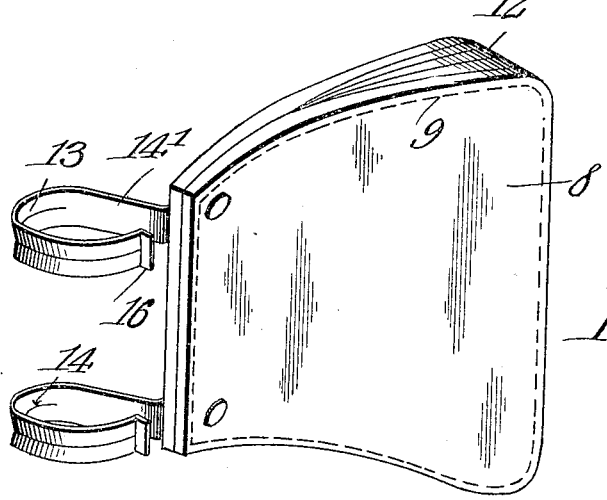
Witnesses
Jackson W. Foster, Inventor
By C. A. Snow & Co., Attorneys

UNITED STATES PATENT OFFICE.

JACKSON W. FOSTER, OF JACKSONVILLE, FLORIDA, ASSIGNOR OF ONE-HALF TO ALEXANDER SABEL, OF JACKSONVILLE, FLORIDA.

PAD FOR HORSE-COLLARS.

No. 927,721.      Specification of Letters Patent.      Patented July 13, 1909.

Application filed October 16, 1908. Serial No. 458,060.

*To all whom it may concern:*

Be it known that I, JACKSON W. FOSTER, a citizen of the United States, residing at Jacksonville, in the county of Duval and State of Florida, have invented a new and useful Pad for Horse-Collars, of which the following is a specification.

This invention relates to a harness and more particularly to a pad or protector especially designed for attachment to a horse collar.

The object of the invention is to provide a pad or protector having means for engagement with the rim of a horse collar, and which not only serves to prevent excessive wear on the collar, but also spaces the trace from the flank of a horse so as to prevent rubbing, lacerating or otherwise injuring the draft animal.

A further object of the invention is to provide a pad or protector including a body portion having its lower face concave to conform to the curvature of the body of the collar and having one end thereof thickened and its opposite end relatively thin and provided with spring clamping members adapted to embrace the rim of the collar and retain the pad in position on said collar and beneath the draft hook.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a portion of a horse collar provided with a pad or protector constructed in accordance with my invention. Fig. 2 is a transverse sectional view of the same. Fig. 3 is a perspective view of the pad or protector detached.

Similar numerals of reference indicate corresponding parts in all of the figures of the drawings.

The improved pad or protector forming the subject matter of the present invention is principally designed for attachment to a horse collar, and by way of illustration is shown in connection with a horse collar of the ordinary construction in which 5 designates the body portion, 6 the rim or roll and 7 the hames.

The device consists of a substantially trapezoidal shaped body portion 8, preferably formed of leather, the several lifts of which are rigidly secured together by a row of stitching 9. The lower surface of the pad is concaved at 10 to conform to the curvature of the collar 5, said pad being positioned on the collar beneath the draft hook 11 so as to prevent excessive wear on the collar. One end of the pad 8 is made relatively thick, as indicated at 12, while the opposite end thereof is relatively thin so as to lie snugly against the collar at the rim 6 and thus offer little, if any obstruction to the hames 7.

Secured to the thin end of the pad 8 are spaced clamping members 13 preferably formed of spring metal and arranged to embrace the rim 6, thereby to retain the pad in position on the collar. The metal forming the clamping members or clips 13 is pressed or stamped to produce a circumferential strengthening rib 14 which also bites into the rim 6 and assists in preventing accidental displacement of the pad. One side of each clamping member is provided with a flat face 14′ to accommodate the hames, while the terminals of the clamping members 13 are bent laterally to produce angularly disposed fingers 16 adapted to fit in the recess between the body of the collar, and rim 6, as best shown in Fig. 3 of the drawings. The clamping members are rigidly secured to the pad 8 by rivets, or similar fastening devices, thereby to prevent slipping or tilting movement of the pad relatively to the collar.

Attention is here called to the fact that by having the outer end of the pad relatively thick, the trace is supported in spaced relation to the flank of a draft animal so as to prevent said trace from rubbing, lacerating or otherwise injuring said draft animal. It will thus be seen that said pad not only serves to protect the collar and prevent excessive wear on the same, but also serves as a means for spacing the trace from the flank of a draft animal, so that the animal may work with comfort.

The pads or protectors may be made in different sizes and shapes and constructed of leather, felt or other suitable material.

Having thus described the invention what is claimed is:—

1. The combination with a horse collar, of a pad adapted to rest on the body of the collar and gradually decreasing in thickness from one end thereof to the other, and means carried by the thin end of the pad for engagement with the rim of the collar.

2. The combination with a horse collar, of a pad having its lower face concave and arranged to bear against the body of the collar, said pad being thicker at one end than at the other, and spring clamping members secured to the thin end of the pad and adapted to embrace the rim of a collar for retaining the pad in position on said collar.

3. A pad or protector for horse collars comprising a body portion, one end of which is thicker than the other, and a clamping member rigidly secured to the thin end of the pad.

4. A pad or protector for horse collars including a substantially trapezoidal shaped body portion formed of superposed lifts secured together by a row of stitching, one end of the body portion being thicker than the other, and spring clamping members rigidly secured to the thin end of the body portion.

In testimony that I claim the foregoing as my own, I have hereto affixed my signature in the presence of two witnesses.

JACKSON W. FOSTER.

Witnesses:
 JENNIE L. WILSON,
 CHAS. G. WILSON.